United States Patent [19]

Treece

[11] Patent Number: 5,147,178
[45] Date of Patent: Sep. 15, 1992

[54] COMPRESSOR SHROUD AIR BLEED ARRANGEMENT
[75] Inventor: William D. Treece, La Mesa, Calif.
[73] Assignee: Sundstrand Corp., Rockford, Ill.
[21] Appl. No.: 744,120
[22] Filed: Aug. 9, 1991
[51] Int. Cl.[5] .............................................. F01D 1/12
[52] U.S. Cl. .................. 415/58.4; 415/173.1
[58] Field of Search ...................... 415/58.4, 134, 135, 415/138, 52.1, 115, 116, 58.2, 58.3, 173.1, 173.3, 174.2, 1

[56] References Cited
U.S. PATENT DOCUMENTS
4,893,983  1/1990  McGreehan .................. 415/116 X
4,981,018  1/1991  Jones et al. .................. 415/143 X FOREIGN PATENT DOCUMENTS
1216322  5/1966  Fed. Rep. of Germany ...... 415/138

Primary Examiner—Edward K. Look
Assistant Examiner—Todd Mattingly
Attorney, Agent, or Firm—Harold A. Williamson

[57] ABSTRACT

The invention is directed to a method of restoring compressor rotor blade/compressor shroud clearance brought on by cold air induced shroud contraction by delivering warmed bleed air through a geodesic array of compressor/turbine support struts which counteracts the cold air induced shroud contraction.

5 Claims, 1 Drawing Sheet

COMPRESSOR SHROUD AIR BLEED ARRANGEMENT

FIELD OF THE INVENTION

This invention relates to rotary machines used as compressors, and more particularly to an axial inflow, radial outflow rotary compressor that experiences cold temperature startup conditions.

BACKGROUND OF THE INVENTION

Present-day advanced aircraft require auxiliary power units (APUs) as a supply of electrical, hydraulic, and pneumatic power to secondary power systems of the aircraft. Generally speaking, the APUs are gas turbine units and must be highly reliable. In addition, compactness is also required. Most suitably, the APUs are then based upon a single shaft, constant speed, gas turbine having a high specific speed, single stage centrifugal compressor, a reverse flow annular combustor, and a single stage radial or axial inflow turbine. Shaft power is utilized to drive electrical generators and/or pumps and compressor bleed air extracted from the system prior to combustion to provide pneumatic power. For high bleed air output, it is necessary to design the compressor to operate adjacent to its maximum flow point, that is, near a so-called "choke" condition. The extraction of increasing amounts of shaft power at constant speed and constant turbine inlet temperatures from the choke point incrementally displace the compressor operating point to lower flows and are eventually limited by encroachment upon the compressor surge line.

The assignee of the instant invention has in the past embraced the problems as defined herein before and defined a solution as described in now issued U.S. Pat. No. 4,981,018 ('018). This solution called for a compressor construction for the APU wherein a compressor hub and associated blades of the impeller formed thereby are surrounded by an annular shroud. Bleed passages in the shroud which are angled in the direction of flow, both axially and radially, have been found to improve efficiency.

While the invention of the '018 patent advanced the state of the art, low operating temperature environmental operating conditions conspired to detract from the turbomachine's overall efficiency especially during startup of the APU's compressor.

The shroud bleed air of the '018 patent, which has been warmed during compression is reingested by the compressor at the compressor inlet. This warmed bleed air appears to stratify toward a compressor outer shroud wall. This warmed stratified bleed air enters an outer flow path of the compressor's inducer section and causes performance penalties to the turbomachine.

In cold ambient air during startup, cold air is drawn into the compressor inlet and in so doing cools inlet support struts and related structure in such a manner as to cause the compressor front shroud structure to pull away from the compressor rotor blades which further deteriorates the turbomachine's performance.

The invention to be described more fully hereinafter solves the problems just enumerated in an exceptionally simple manner.

SUMMARY OF THE INVENTION

The principal object of the invention is to provide a geodesic mounted compressor/turbine engine with enhanced cold environment startup performance. This objective is accomplished by means of a method that ensures a mating relationship between a compressor shroud and a mating compressor rotor blade arrangement. The compressor shroud and an associated compressor housing are structurally supported by hollow elongated struts in a geodesic array. The struts span a compressor inlet region and are cooled by low temperature inlet ambient air passing over the geodesic array of struts. The cooling of the struts results in the physical contraction or shrinking of the struts such that the shroud is pulled away from the mating compressor rotor blade arrangement, thereby increasing rotor blade clearance between the rotor and the shroud which causes a performance drop in the compressor.

The method of the invention calls for bleeding air through passages in the shroud. The air so bled has been warmed by compression of the inlet air by the action of the compressor blade arrangement on the low temperature inlet air. This bleeding step is followed by delivering the bled, warmed, compressed inlet air through the hollow struts to warm the same and thereby cause the struts to expand thereby decreasing the clearance between the mating compressor rotor blade and the compressor shroud which restores compressor performance.

In summary, the bleed air is warmed during its compression, and its passage through the support struts warms the struts and prevents a front compressor shroud secured to the struts from pulling away from the compressor impeller during cold ambient compressor starting.

Other objects and advantages will become apparent from the following specification taken in conjunction with the accompanying drawings.

DESCRIPTION OF THE PREFERRED EMBODIMENT

Figure 1:
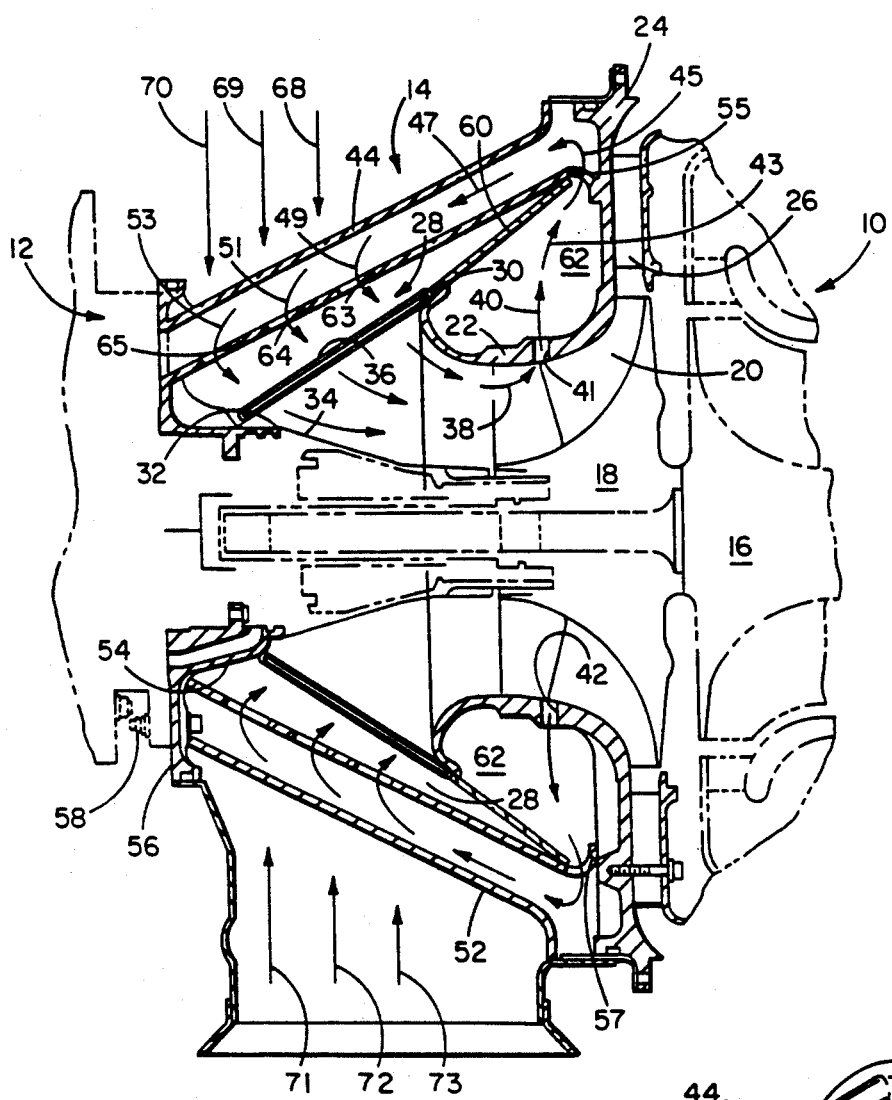
FIG. 1 is a fragmentary sectional view of an air breathing compressor made in accordance with the invention.

Reference is now made to FIG. 1 which illustrates in cross-sectional detail a compressor made in accordance with the invention, as well as a portion of a radial turbine engine generally designated 10, which is shown in phantom outline. A transmission 12, shown schematically, has interposed between the radial turbine engine 10 and the transmission 12 a compressor 14.

The engine 10 includes a turbine rotor hub 16 and the compressor 14 has a compressor hub 18 which mounts a plurality of compressor blades 20 to define a rotary, radial outflow centrifugal compressor. The blades 20 are closely adjacent a fixed, compressor shroud section 22, which shroud section forms a portion of a compressor housing 24. A conventional diffuser 26 receives air compressed by the blades 20. The diffuser 26 is supported in part by the compressor housing 24.

The compressor 14 includes an inlet region 28 that exists between a front edge 30 of the compressor housing shroud section 22 and a front edge 32 of an inlet throat wall 34. It should be readily appreciated that the inlet region 28 is annular in nature. A screen 36 is provided across the inlet region 28 to ensure particulate matter in the atmosphere is not ingested by the compressor and delivered to the turbine engine 10. Air drawn in through the inlet region moves along a path 38 defined by the compressor shroud section 22. As the air moves along path 38, the air is compressed by the action of the rotor blades 20. The act of compression warms the air so compressed. A warmed portion 40 of the air along path 38 is bled through bleed passages 41, 42 in the compressor shroud section 22.

Figure 2:
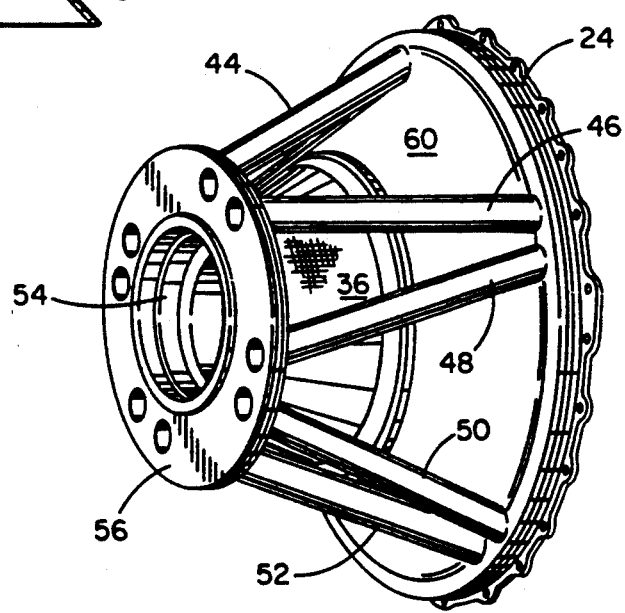
FIG. 2 is a three-dimensional illustration of a geodesic tubular compressor strut structure shown in section in FIG. 1, which strut structure includes fluid distribution openings of the invention.

A series of tubular support struts 44, 46, 48, 50, and 52 (see FIGS. 1 and 2) is integrally secured at the left hand end as FIGS. 1 and 2 are viewed, to a ring-like structure 54 that includes a radially outwardly extending, peripheral flange 56. The peripheral flange 56 is secured by fasteners, one of which 58 is shown, to the transmission.

The right-hand ends of struts 44, 46, 48, 50, and 52 are integrally made a part of the compressor housing 24 by welding or any other suitable means. The struts form a geodesic turbine engine mount structure that is light in weight and provides substantial torsional rigidity. Cold inlet air indicated by arrows 68, 69, 70, 71, 72 and 73 pass over as shown in FIG. 1 struts 44 and 52 cooling the same and causing the metal of which they are fabricated to shrink. Because the struts are integrally connected to the shroud 22, the contraction of the struts pulls the shroud 22 away from the compressor rotor blades 20 which results in a loss of compressor performance.

A frusta conically-shaped annular shroud bleed baffle 60, positioned as shown between front edge 30 and the housing 24, creates an annular bleed air directing chamber 62 which receives bleed air via passages 41, 42. While only two bleed passages 41, 42 are shown in FIG. 1, similar passages are arrayed around the shroud section 22.

Attention is now directed to support strut 44 as seen in FIG. 1. The structure and function of strut 44 is the same as the other struts depicted in FIGS. 1 and 2. The struts collectively function as a fluid distributing unit or means where, in the case at hand, the fluid is warmed bleed air that has entered the bleed air directing chamber 62 via the passage 41 in the compressor shroud section 22. Air flow arrows 43, 45, 47, 49, 51, and 53 graphically depict a flow path of the warmed bleed air from bleed air directing chamber 62.

It will be observed that each tubular support strut, such as struts 44 and 52 (FIG. 1), has a strut inlet opening 55 and 57 at a strut end adjacent the compressor housing 24. Warmed bleed air passes through the strut inlet openings as indicated by the air flow arrows. The support struts 44, 46, 48, 50, and 52 may be thought of functionally as ducts or duct means which are/is integrally secured to the compressor housing 24. The warm bleed air passing through the struts warms the same causing them to expand in oppposition to the contraction that arises due to cold air passage thereover as noted earlier. The warming of the struts ensures that the shroud 22 remains in close proximity to the compressor blades 20 which results in enhanced low start temperature performance of the compressor. Although this invention has been illustrated and described in connection with the particular embodiments illustrated, it will be apparent to those skilled in the art that various changes may be made therein without departing from the spirit of the invention as set forth in the appended claims.

I claim:

1. In a compressor a method of ensuring a mating relationship between a compressor shroud and a mating compressor rotor blade arrangement where said compressor shroud and an associated compressor housing are structurally supported by elongated members that span a compressor inlet region, said elongated support members being cooled by low temperature inlet ambient air passing thereover such that said elongated support members contract and pull said shroud away from said mating compressor rotor blade arrangement thereby increasing compressor rotor blade clearance between said rotor and said shroud causing a performance drop in said compressor, said method including the steps of:
   (a) bleeding air through passages in said shroud, said bled air being warmed by compression of said inlet air by action of said compressor blade arrangement on said low temperature inlet air; and
   (b) delivering said bled warmed compressed inlet air through said elongated support members to thereby overcome said cooling of said members by said low temperature inlet ambient air and decrease clearance between said mating compressor rotor blade and said compressor shroud, thereby restoring compressor performance.

2. The method of claim 1 wherein said elongated support members are tubular in nature.

3. The method of claim 2 wherein said tubular support members are arranged in a geodesic array around said compressor inlet region, said geodesic array of said tubular support members secured at one end to said compressor housing and said shroud.

4. The method of claim 3 wherein each of the tubular support members is provided with a warmed bleed air inlet opening adjacent said compressor housing and said shroud.

5. The method of claim 4 wherein each of said tubular support members is provided with an outlet opening adjacent said compressor inlet region.

* * * * *